US012608794B2

(12) United States Patent
Howes et al.

(10) Patent No.: US 12,608,794 B2
(45) Date of Patent: Apr. 21, 2026

(54) DOPAMINERGIC IMAGING TO PREDICT TREATMENT RESPONSE IN MENTAL ILLNESS

(71) Applicant: King's College London, London (GB)

(72) Inventors: Oliver Howes, London (GB); Mattia Veronese, London (GB)

(73) Assignee: King's College London, London (GB)

( * ) Notice: Subject to any disclaimer, the term of this patent is extended or adjusted under 35 U.S.C. 154(b) by 588 days.

(21) Appl. No.: 17/782,736

(22) PCT Filed: Nov. 30, 2020

(86) PCT No.: PCT/GB2020/053073
§ 371 (c)(1),
(2) Date: Jun. 6, 2022

(87) PCT Pub. No.: WO2021/111116
PCT Pub. Date: Jun. 10, 2021

(65) Prior Publication Data
US 2023/0024712 A1      Jan. 26, 2023

(30) Foreign Application Priority Data
Dec. 6, 2019    (GB) ...................................... 1917919

(51) Int. Cl.
*G06T 7/00*          (2017.01)
(52) U.S. Cl.
CPC ........ *G06T 7/0012* (2013.01); *G06T 2207/10* (2013.01); *G06T 2207/20084* (2013.01)

(58) Field of Classification Search
CPC .............. G06T 7/0012; G06T 2207/10; G06T 2207/20084; G06T 2207/10108; G06T 2207/20128; G06T 2207/30016
See application file for complete search history.

(56) References Cited

PUBLICATIONS

Jauhar, S., Veronese, M., Nour, M.M., Rogdaki, M., Hathway, P., Turkheimer, F.E., Stone, J., Egerton, A., McGuire, P., Kapur, S. and Howes, O.D., 2019. Determinants of treatment response in first-episode psychosis: an 18F-DOPA PET study. Molecular psychiatry, 24(10), pp. 1502-1512.*
Rahmim, A., Huang, P., Shenkov, N., Fotouhi, S., Davoodi-Bojd, E., Lu, L., Mari, Z., Soltanian-Zadeh, H. and Sossi, V., 2017. Improved prediction of outcome in Parkinson's disease using radiomics analysis of longitudinal Dat Spect images. NeuroImage: Clinical, 16, pp. 539-544.*

(Continued)

*Primary Examiner* — Zhitong Chen
(74) *Attorney, Agent, or Firm* — Banner & Witcoff, Ltd.

(57) ABSTRACT
A neuroimaging-based approach to predict treatment response in mental disorders by acquiring and analysing brain PET dopamine measures from patients. The method uses a short, simplified protocol for [18F]FDOPA brain PET imaging adapted for clinical practice. Individual [18F] FDOPA brain PET data are then quantified with a fully-automated analysis pipeline to extract information on the dopamine function of the subject. This information coupled with clinical information is run through a prediction algorithm to identify those patients whose illness will not respond to conventional antipsychotics.

19 Claims, 10 Drawing Sheets

TREATMENT RESPONSE PREDICTION ALGORITHM

(56) References Cited

PUBLICATIONS

Tang, J., Yang, B., Adams, M.P., Shenkov, N.N., Klyuzhin, I.S., Fotouhi, S., Davoodi-Bojd, E., Lu, L., Soltanian-Zadeh, H., Sossi, V. and Rahmim, A., 2019. Artificial neural network-based prediction of outcome in Parkinson's disease patients using DaTscan SPECT imaging features. Molecular imaging and biology, 21.*

Schwarzenberg, J., Czernin, J., Cloughesy, T.F., Ellingson, B.M., Pope, W.B., Grogan, T., Elashoff, D., Geist, C., Silverman, D.H., Phelps, M.E. and Chen, W., 2014. Treatment response evaluation using 18F-FDOPA PET in patients with recurrent malignant glioma on bevacizumab therapy. Clinical Cancer Research, 20(13).*

Verhoeff, N.P.L., 1999. Radiotracer imaging of dopaminergic transmission in neuropsychiatric disorders. Psychopharmacology, 147, pp. 217-249.*

Fazlollahi et al., "Automatic Brain Tumour Segmentation In 18F-FDOPA PET using PET/MRI Fusion" International Conference on Digital Image Computing: Techniques and Applications, 2011.

Davis et al, "Dopamine in Schizophrenia: A Review and Reconceptualization" Am J Psychiatry, vol. 148, No. 11, Nov. 1991.

Demjaha et al., "Dopamine Synthesis Capacity in Patients With Treatment-Resistant Schizophrenia" Am J Psychiatry, vol. 169, No. 11, Nov. 2012.

Egerton et al., "Presynaptic Striatal Dopamine Dysfunction in People at Ultra-high Risk for Psychosis: Findings in a Second Cohort" Biology Psychiatry, vol. 74, pp. 106-112, 2013.

Howes et al., "Mechanisms Underlying Psychosis and Antisychotic Treatment Response in Schizophrenia: Insights from PET and SPECT Imaging" Betham Science Publishers Ltd, vol. 15, 2009.

Howes et al., "Adherence to treatment guidelines in clinical practice: study of antipsychotic treatment prior to clozapine initiation", The British Journal of Psychiatry, vol. 201, pp. 481-485, 2012.

Howes et al., "The Nature of Dopamine Dysfunction in Schizophrenia and What This Means for Treatment: Meta-Analysis of Imaging Studies", Arch Gen Psychiatry, vol. 69, No. 8, Aug. 7, 2012.

Howes et al. "Glutamate and dopamine in schizophrenia: An update for the 21st century" Journal of Psychopharmacology, pp. 1-19, Jan. 14, 2015.

Howes et al., "The Dopamine Hypothesis of Schizophrenia:Version III—The Final Common Pathway" Schizophrenia Bulletin.

Howes et al., "Dopamine Synthesis Capacity Before Onset of Psychosis: A Prospective [18F]-DOPA PET Imaging Study" Am J Psychiatry, vol. 168, No. 12, pp. 1311-1317, Dec. 2011.

Howes et al., "Treatment-Resistant Schizophrenia: Treatment Response and Resistance in Psychosis (TRRIP) Working Group Concensus Guidelines on Diagnosis and Terminology" Am J Psychiatry, vol. 174, No. 3, pp. 216-229, Mar. 2017.

Jauhar et al., "A Test of the Transdiagnostic Dopamine Hypothesis of Psychosis Using Positron Emission Tomographic Imaging in Bipolar Affective Disorder and Schizophrenia", JAMA Psychiatry, vol. 74, No. 12, pp. 1206-1213, Oct. 11, 2017.

Kapur et al., "Relationship Between Dopamine D2 Occupancy, Clinical Response, and Side Effects: A Double-Blind PET Study of First-Episode Schizophrenia" Am J Psychiatry, vol. 157, No. 4, Apr. 2000.

Kennedy et al., "The social and economic burden of treatment-resistant schizophrenia: a systematic literature review", International Clinical Psychopharmacology, vol. 00, No. 00, Jul. 4, 2013.

Mar. 15, 2021—(WO) International Search Report and Written Opinion—App PCT/GB2020/053073.

Sep. 2, 2020—(GB) Search Report—APP 1917919.1.

Stephanie J Lewis et al: "Brain monoamine systems in multiple system atrophy: A positron emission tomography study", Neurobiology of Disease, Elsevier, Amsterdam, NL, vol. 46, No. 1, Dec. 31, 2011 (Dec. 31, 2011), pp. 130-136.

Egerton Alice et al: "Presynaptic Striatal Dopamine Dysfunction in People at Ultra-high Risk for Psychosis: Findings in a Second Cohort", Biological Psychiatry, Elsevier Science, New York, NY; US, vol. 74, No. 2, Jan. 8, 2013 (Jan. 8, 2013), pp. 106-112.

Jauhar Sameer et al: "Determinants of treatment response in first-episode psychosis: an 18F-DOPA Pet study", Molecular Psychiatry, Basingstoke, GB, vol. 24, No. 10, Apr. 20, 2018 (Apr. 20, 2018), pp. 1502-1512.

Nicola Pavese et al: "Progression of monoaminergic dysfunction in Parkinson's disease: A longitudinal 18F-dopa PET study", Neuroimage, Elsevier, Amsterdam, NL, vol. 56, No. 3, Mar. 3, 2011 {Mar. 3, 2011), pp. 1463-1468.

Xiao-Bo Pan et al: Improving Influx Constant and Ratio Estimation in FDOPA Brain PET Analysis for Parkinson's Disease Kinetic Modeling of FDOPA 11, J Nucl Med, Jan. 1, 2005 (Jan. 1, 2005), pp. 1737-1744.

Eleni Zarogianni et al: "Towards the identification of imaging biomarkers in schizophrenia, using multivariate pattern classification at a single-subject level", Neuroimage: Clinical, vol. 3, Jan. 1, 2013 (Jan. 1, 2013), pp. 279-289.

Anonymous: "Statistical parametric mapping—Wikipedia", Dec. 5, 2019 (Dec. 5, 2019), XP055719335, Retrieved from the Internet: URL:https://en.wikipedia.org/w/index.php?title=Statistical_parametric_mapping&oldid=924689396 [retrieved on Jul. 30, 2020].

Shelly Soffer et al: "Convolutional Neural Networks for Radiologic Images: A Radiologist's Guide", Radiology, vol. 290, No. 3, Mar. 1, 2019 (Mar. 1, 2019), pp. 590-606.

* cited by examiner

[18F]FDOPA PET image – right elevation

[18F]FDOPA PET image – front elevation

[18F]FDOPA PET image – plan view

208

[18F]FDOPA PET template – plan view

[18F]FDOPA PET template – front elevation

[18F]FDOPA PET template – right elevation

[18F]FDOPA PET SUVRc map– right elevation    [18F]FDOPA PET SUVRc map – front elevation    [18F]FDOPA PET SUVRc map – plan view

408

Tracer uptake
(SUVRc)

0    5 s.10.01     LOAD SUVRc MAP s.10.02     RUN QUALITY CONTROL s.10.03     QC FAILED s.10.05     QC PASSED s.10.04     DISPLAY FAILURE s.10.06     REQUEST INPUT FOR CLINICAL DATA s.10.07     RUN PREDICTION ALGORITHM s.10.08     DETERMINISTIC CLASSIFICATION s.10.09     PROBABILISTIC CLASSIFICATION s.10.10     APPLY TRESHOLDING s.10.11     DISPLAY TREATMENT RESPONSE

DOPAMINERGIC IMAGING TO PREDICT TREATMENT RESPONSE IN MENTAL ILLNESS

CROSS-REFERENCE TO RELATED APPLICATIONS

The present application is a U.S. National Phase of International Application No. PCT/GB2020/053073, which was filed on Nov. 30, 2020, designating the United States of America and claiming priority to United Kingdom Application No. 1917919.1, filed on Dec. 6, 2019. This application claims priority to and the benefit of the above-identified applications, which are all fully incorporated by reference herein in their entireties.

TECHNICAL FIELD

Embodiments of the present invention described herein relate to methods and systems for using dopaminergic radiotracers in PET imaging, and for analysing the resulting images in order to predict a subject's response to particular treatments for mental illnesses. In particular, methods and systems for PET imaging of a subject's brain using dopaminergic radiotracers which take significantly less time than prior art methods are described, together with methods and systems for analysing the resulting images in an automated fashion to obtain a prediction of a particular imaged subject's propensity to respond to particular treatments for mental illness.

BACKGROUND TO THE INVENTION AND PRIOR ART

About one third of patients with psychotic disorders do not respond to first-line treatment (Howes, McCutcheon et al. 2017). They require different treatment but there is currently no way to identify in advance who these people will be. In clinical practice it generally takes a series of empirical trials with different first-line treatments to establish someone's illness will not respond to first-line treatment before alternative treatment can be started. This leads to delays in getting effective treatment to patients, on average about 4 years (Howes, Vergunst et al. 2012), increasing patient burden and costs (Kennedy, Altar et al. 2014). The clinical problem is thus to identify patients who will be non-responders earlier, within the first few weeks of presentation. There are currently no clinical criteria that are able to identify non-responders accurately. Research has identified a number of imaging and other biological markers that are correlated with treatment response but again none of them shows sufficient accuracy to be used and none have been developed into a theragnostic test.

Both the role of dopamine hyperactivity in the pathoetiology of psychosis (Davis and Kahn 1991, Howes and Kapur 2009, Howes, McCutcheon et al. 2015), and findings that antipsychotic drugs act by blocking dopamine (Kapur, Zipursky et al. 2000, Howes, Egerton et al. 2009) indicate that dopaminergic function as a candidate biomarker for treatment response. A number of studies have shown that striatal dopamine synthesis capacity as measured by [18F] FDOPA PET imaging, is elevated in schizophrenia (Howes, Kambeitz et al. 2012), schizophreniform psychoses (Jauhar, Nour et al. 2017) as well as in people at clinical high risk for psychosis (UHR), and linked to the subsequent development of psychosis (Howes, Bose et al. 2011, Egerton, Chaddock et al. 2013). Moreover, dopamine synthesis capacity has been found to distinguish patients who have responded to standard antipsychotic drugs from non-responders (Demjaha, Murray et al. 2012, Jauhar, Veronese et al. 2018). This evidence suggests that measuring dopaminergic function with [18F]FDOPA PET imaging could be used as a neurochemical basis to stratify patients into those likely to respond and those unlikely to respond to first-line antipsychotic drugs.

For a diagnostic test to be clinically useful it also needs to be practical. One main limitation of the [18F]FDOPA PET imaging used in prior studies is the long duration of the scans, about 95 minutes. This impedes the method to be usable in standard clinical routines because of poor patient tolerability to long imaging acquisition, technical limitations to implementing the method for clinically-oriented PET imaging centres, and high cost of the procedure.

SUMMARY OF THE INVENTION

Embodiments of the present invention address the above problem, by providing a fully-automated analysis pipeline for PET imaging data obtained with the use of dopaminergic radiotracers in combination with a simplified PET imaging acquisition protocol viable for routine clinical practice. Embodiments of the present invention can take a single PET image obtained using a DOPA labelled radiotracer, analyse the PET image to produce a map of a patient's brain which is then input into a prediction algorithm which outputs a probability of the patient not responding to standard treatment. Various radiotracers may be used in embodiments, but particular embodiments make use of [18F]-DOPA (3,4-dihydroxy-6-F-18-fluoro-L-phenylalanine) as the radiotracer, although other DOPA-labelled radiotracers such as [11C]-DOPA may also be used.

In view of the above, from a first aspect, the present disclosure relates to a method of analysing a PET image obtained using a DOPA labelled radiotracer. The method comprises the steps of: spatially normalising the PET image to a standard template; segmenting the PET image to define at least one region of interest; computing an index of the uptake of the DOPA labelled radiotracer; and producing a map displaying a magnitude of the index in a patient's brain.

Several advantages are obtained from embodiments according to the above described aspect. For example, at present there is no current licensed or otherwise clinically established approach to predicting treatment response in patients with psychosis. The current state-of-the-art is thus trial and error, which takes on average 4 years per patient. Moreover, there is no current imaging-based method established to predict treatment response. The advantage of embodiments of the present invention is the ability to provide a prediction of treatment response to guide treatment choice prospectively, potentially within days of illness onset, avoiding the current need for a series of costly empirical trials of different first-line treatments, saving time, costs and patient burden.

In addition, in embodiments of the present disclosure the analytics and prediction algorithm can use a single PET image. The scan acquisition protocol for DOPA-labelled radiotracer PET imaging enables scan acquisition in less than 20 minutes in embodiments of the invention. This makes the process much more practical in a clinical environment as patients do not tolerate long imaging acquisition well and dynamic scanning is not available in the majority of nuclear medicine clinical facilities. As comparison, previous [18F]FDOPA PET acquisition took over 95 minutes continuously from a radiotracer injection.

Moreover, within embodiments of the present invention the image analysis is not operator dependent, it is an automated image pipeline. This improves the reliability of the output. In addition, packaging the image analysis into a one-stop user-friendly automated pipeline means that the user does not require the same level of training as they would to operate the image analysis steps manually.

In some embodiments, prior to analysing the PET image, the image may be corrected for attenuation using an image obtained from a CT scan or a MRI scan. Segmenting the PET image may comprise applying atlas-based tissue segmentation to the PET image. Spatially normalising the PET image may comprise using a combination of linear and/or non-linear transformations. The linear transformations may comprise affine transformations. The non-linear transformations may comprise warp maps. The standard template may be a standard DOPA labelled radiotracer PET template. The standard DOPA labelled radiotracer PET template may be in standard MNI coordinates. The atlas-based tissue segmentation may be applied to the PET image in standard MNI coordinates.

In addition, in some embodiments the at least one region of interest may comprise a first of interest and a second region of interest. The index of the DOPA labelled radiotracer uptake may be defined by the ratio of DOPA labelled radiotracer activity in the first region of interest to that in the second region of interest. The first region of interest may be a striatum and the second region of interest may be a cerebellum.

In some embodiments, the map may be produced by dividing each voxel of the PET image by mean activity of the DOPA labelled radiotracer in a cerebellum. In addition, and as mentioned previously, in some embodiments the DOPA labelled radiotracer may be [18F]FDOPA (3,4-dihydroxy-6-F-18-fluoro-L-phenylalanine), [11C]-DOPA or any other suitable radiotracer, particularly any dopaminergic radiotracer.

In a second aspect of the invention, there is provided a method for predicting treatment response of a patient with a mental disorder. The method comprises receiving a map of a patient's brain displaying uptake of a DOPA labelled radiotracer and inputting the map and patient data into a prediction algorithm, which outputs a prediction of whether the patient will not respond to standard treatment.

The algorithm may use artificial intelligence or machine learning methods. The output may further comprise a probability of the patient not responding to standard treatment. The algorithm may further comprise applying a threshold to the probability of the patient not responding to standard treatment. The threshold may be >95%. The algorithm may further comprise returning a deterministic classification profile of the patient as either a treatment responder or a treatment resister. The algorithm may have been trained on an existing DOPA labelled radiotracer PET dataset from patients with a mental disorder.

The algorithm may further comprise performing a quality control step on the map, and preferably wherein the quality control step comprises one or more of the following:
- (i) analysing DOPA labelled radiotracer activity to ensure DOPA labelled radiotracer activity is highest in the striatum region;
- (ii) analysing signal to noise ratio of DOPA labelled radiotracer activity;
- (iii) statistical testing of DOPA labelled radiotracer activity between brain and non-brain tissues;
- (iv) statistical testing of DOPA labelled radiotracer activity between brain and background activity.

- (v) analysing the spatial distribution of the brain DOPA labelled radiotracer activity in comparison with a standard template of images which may preferably be built from an existing library of quality controlled DOPA labelled scans.

In a third aspect of the invention, there is a method of predicting treatment response of a patient with a mental disorder. The method comprises analysing a PET image to produce a map as described above, and then inputting the map into a prediction algorithm to output a prediction of whether the patient will not respond to standard treatment, as also described above.

In a fourth aspect of the invention, there is a method of obtaining a DOPA PET image of a patient with a mental disorder for use in the method as described above. The method comprises administering a DOPA labelled radiotracer to the patient via an intravenous bolus injection and performing a PET scan over a time period to form the PET image, wherein the time period is less than 20 minutes. The time period may be less than 15 minutes, and preferably less than 10 minutes.

In a fifth aspect of the invention, there is a system for analysing a PET image obtained using a DOPA labelled radiotracer. The system comprises a processor and a memory including computer program code. The memory and the computer program code are configured to, with the processor, cause the apparatus to perform the method of analysing a PET image as described above.

In a sixth aspect of the invention, there is a system for predicting treatment response of a patient with a mental disorder. The system comprises a processor and a memory including computer program code. The memory and the computer program code configured to, with the processor, cause the apparatus to perform the method of predicting treatment response as described above.

In a seventh aspect of the invention, there is a system for predicting treatment response of a patient with a mental disorder. The system comprises a PET scanner, a processor and a memory including computer program code. The memory and the computer program code configured to, with the processor, cause the apparatus to perform the method obtaining a DOPA PET image of a patient with a mental disorder, as described above.

In view of the above, some embodiments of the invention therefore provide a neuroimaging-based approach to predict treatment response in mental disorders by acquiring and analysing brain PET dopamine measures from patients. The method uses a short, simplified protocol for [18F]FDOPA brain PET imaging adapted for clinical practice. Individual [18F]FDOPA brain PET data are then quantified with a fully-automated analysis pipeline to extract information on the dopamine function of the subject. This information coupled with clinical information is run through a prediction algorithm to identify those patients whose illness will not respond to conventional antipsychotics.

BRIEF DESCRIPTION OF THE DRAWINGS

Embodiments of the invention will now be further described by way of example only and with reference to the accompanying drawings, wherein like reference numerals refer to like parts, and wherein.

DESCRIPTION OF THE EMBODIMENTS

Overview

Embodiments of the present invention are used to predict treatment response in patients with mental disorders. In particular, some embodiments of the present invention use a quick PET scan (less than twenty minutes, preferably less than fifteen minutes, and most preferably less than ten minutes) using a DOPA-labelled radiotracer to obtain an image which shows the uptake of the DOPA in a patient's brain. Once the image has been obtained, the image undergoes automated image analysis. This may involve calibrating the image to standard Montreal Neurological Institute (MNI) coordinates, segmenting the image into regions of interest and then normalising the image to help regions of high DOPA uptake stand out. A simplified index of DOPA uptake (SUVRc), defined by the ratio of tracer activity in the striatum to that in the cerebellum is used as a proxy for dopamine synthesis capacity. A map of SUVRc in the brain is then produced. A quality control step may be performed on the SUVRc map before it is used as an input into the prediction algorithm, along with patient data. The prediction algorithm uses artificial intelligence and may be trained on DOPA PET images. The output of the prediction algorithm is the probability of a patient not responding to standard treatment. This probability may then be used to classify the patient as either a non-responder or a responder.

In addition, some embodiments of the present invention provide a fully-automated analysis pipeline for DOPA labelled (such as [18F]FDOPA) PET imaging data in combination with a simplified DOPA labelled (e.g. [18F] FDOPA) PET acquisition protocol viable for routine clinical practice.

Both the imaging acquisition and data analysis methods have been designed to quantify presynaptic dopamine function and use this information to predict treatment response in patients with psychosis at multiple stages of the disease:

at first presentation to determine if they are likely to respond to first-line treatment or will be non-responders and so should be started an alternative treatment;

chronic patients who have relapsed to determine if they are likely to respond to first-line treatment or will be non-responders and so should be started to an alternative treatment; and chronic patients who are showing an inadequate response to treatment to determine if they are likely to respond to first-line treatment if given longer on treatment or if they should switch to an alternative treatment.

An additional use of embodiments of the invention is as a screening test for drug development companies in order to select those patients benefit for a certain treatment, increasing efficiencies for clinical trials.

Figure 1:
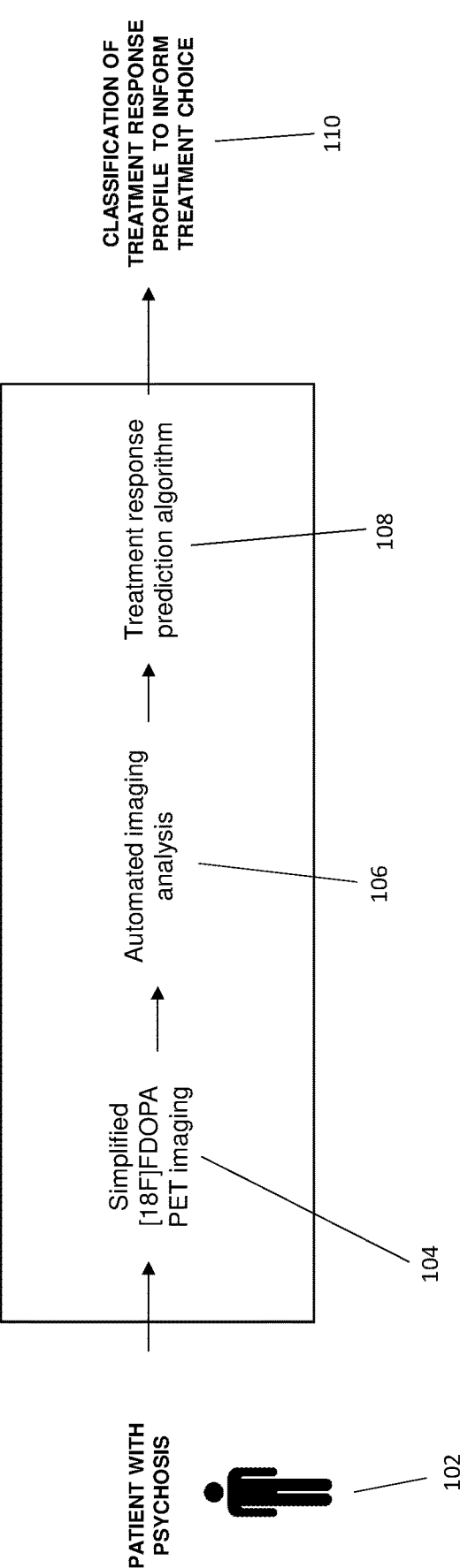
FIG. 1 is a diagram illustrating the components of embodiments of the present invention.

As shown in FIG. 1, embodiments of the present invention are made of three principal components: a simplified DOPA labelled radiotracer (such as [18F]FDOPA) PET imaging protocol 104, an automated imaging analysis pipeline 106 and a treatment response prediction algorithm 108 trained on an existing DOPA labelled radiotracer (such as [18F]FDOPA) PET dataset from patients with psychosis. Various aspects and details of these three principal components will be described in detail below. During the below description mention is made by way of example only to the specific use of [18F]FDOPA as the radiotracer, but it should be understood that any suitable dopaminergic radiotracer may be used, although [F-18]FDOPA is provides good results. One reason for this is due to the half life of the radio tracer meaning that it can be assured that the radiotracer will still be present in good quantities throughout the scan period, particularly for the shortened scan period provided by embodiments of the invention.

Scan

Prior to a PET scan, drugs may be administered orally one hour before imaging to improve the signal to noise ratio (SNR) of the tracer uptake. A CT or MRI scan of the brain may then be taken to be used for attenuation correction. The [18F]FDOPA tracer may be administered by intravenous bolus injection. After an uptake phase of a variable duration (the duration may be more than 5 minutes, preferably more than 30 minutes, more preferably more than 45 minutes, and most preferably more than 60 minutes) needed to enable the radiotracer to reach the brain and the target, a PET scan is then carried out. PET imaging acquisition is performed in less than twenty minutes, preferably less than fifteen minutes, and most preferably less than ten minutes, to produce an image showing the uptake of [18F]FDOPA. The spatial resolution of the scan may be between 3 mm and 10 mm, and more preferably between 3 mm and 5 mm. The sensitivity of the scan may be greater than 4 cps/kBq, more preferably between 4 and 10 cps/kBq, and even more preferably greater than 10 cps/kBq. The image may be corrected for attenuation using the CT or MRI scan.

Image Analysis

A fully-automated image analysis pipeline to extract the information related to dopamine from a [18F]FDOPA PET imaging scan has been developed. The pipeline may include one or more of the steps of motion correction, image segmentation, data extraction and normalisation. The pipeline packages one or more of these steps into a one-stop user-friendly program which provides the key output to the user.

The image may be motion corrected. A tracer-specific template with a functional striatal atlas, along with the cerebellum used as a reference region, may be co-registered onto each image using spatial normalisation algorithms, for example, spatial normalisation algorithms used by Statistical Parametric Mapping or FSL or other software.

The image may be spatially normalised to a standard [18F]FDOPA template in standard MNI coordinates, and segmented into regions of interest. Spatial normalisation to MNI coordinate may use the same algorithms applied for the tracer-specific template co-registration to the subject PET image. Image segmentation may use either manual region drawing or atlas-based segmentation. Atlas-based segmentation segments the image into regions of interest, for example, the cerebellum and the striatum. The SUVRc, defined above, is then calculated and displayed as a map of the patient's brain.

Other methods of image segmentation may of course be used. For example, image intensity thresholding to separate the regions with different levels of tracer uptake, functional clustering (e.g. k-means clustering) to classify region with similar tracer kinetics, edge detection to identifies those regions where there is a change in tracer uptake, region-growing methods etc.

Prediction Algorithm

Once the SUVRc map has been produced, it may undergo a quality control step before being used as an input into the prediction algorithm. The quality control step may involve establishing whether the spatial distribution of [18F]FDOPA PET signal follows normal brain neuroanatomy. This could include determining that the average uptake signal in the striatum is the highest uptake signal across the brain and that the SUVRc in the striatum is significantly higher than the SUVRc in the cerebellum. The quality control step may also involve the analysis of the signal to noise ratio to determine whether signal from the tracer uptake into the brain tissues (including striatum) over the noise in the image enables the prediction algorithm to deliver a patient classification of treatment response.

The SUVRc map, which may be quality controlled, and patient data are used as inputs into the prediction algorithm. The prediction algorithm may use supervised machine learning (e.g. Logistic Regression, Support Vector Machine, Random Forest, Gaussian process regression) or deep learning (e.g. artificial neuronal network) algorithms which have been trained on [18F]FDOPA PET images of patients which have responded to standard treatment, images of patients which did not respond to standard treatment and normal control images. The prediction algorithm may return a classification of the patient not responding to standard treatment or the probability of the patient not responding to standard treatment. In case of probabilistic classification, a threshold may be used to classify the patient as either a treatment responder or a treatment resistor.

In view of the above described overview of the embodiments of the invention, further details of the three main components of the embodiments will be given below i.e. of the simplified DOPA labelled radiotracer (such as [18F] FDOPA) PET imaging protocol 104, the automated imaging analysis pipeline 106 and the treatment response prediction algorithm 108.

Component 1—Simplified [18F]FDOPA PET Imaging Protocol

Figure 2:
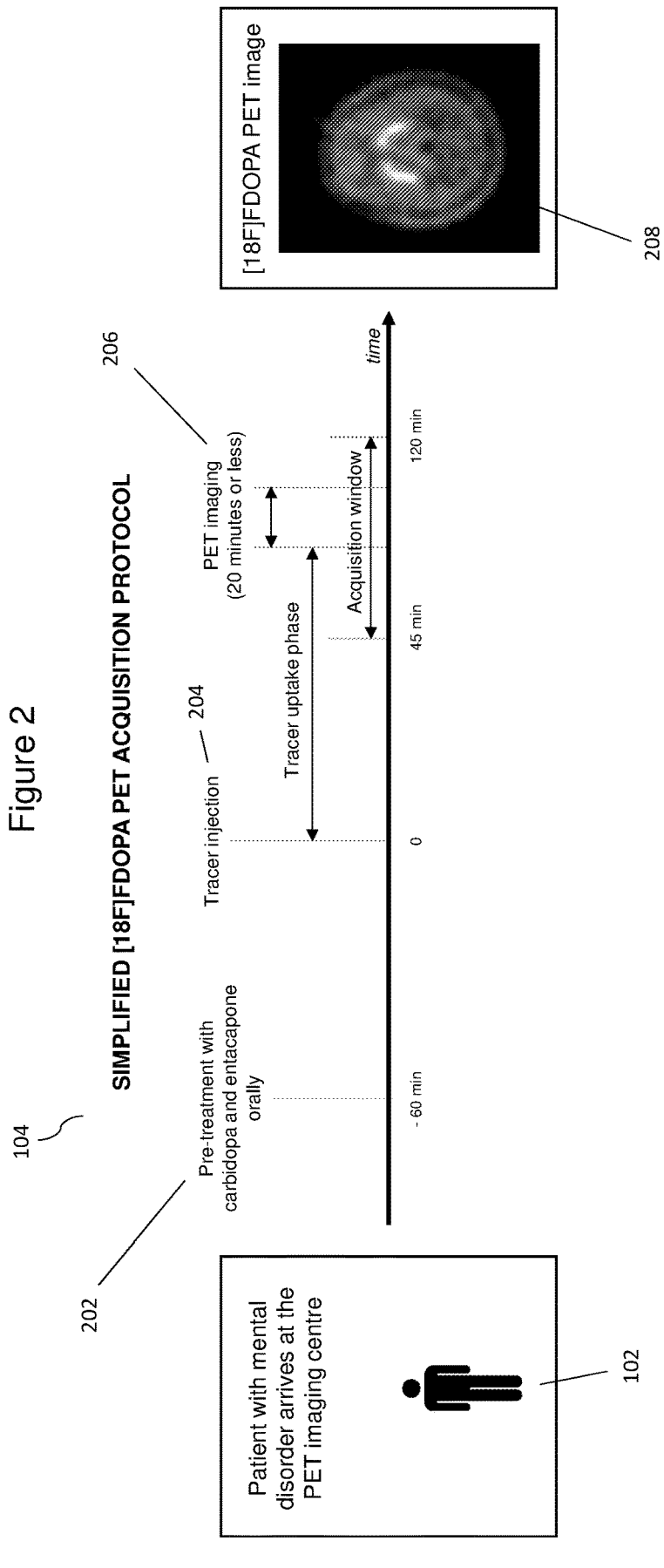
FIG. 2 is a diagram illustrating the [18F]FDOPA PET acquisition protocol.

The current approach to [18F]FDOPA imaging used in the field uses a continuous dynamic acquisition over about 90 minutes. A continuous dynamic [18F]FDOPA PET imaging is unfeasible in clinical practice. To address this problem the inventors have developed an alternative. This is a simplified protocol that comprises of a short static acquisition (less than twenty minutes, preferably less than fifteen minutes, and most preferably less than ten minutes) of the tracer brain activity. This is possible as the current approach used in the field requires a time series of images (taken in an approximately 90 minute scan), whereas the current invention only requires a single image. As shown in FIG. 2, prior to the PET scan, the radiotracer is injected intravenously into the participant 204. The PET imaging starts after an uptake phase of preferably 45-60 mins to allow the radiotracer to be distributed throughout the body by the blood circulation. PET imaging 206 is completed within 120 minutes from the tracer injection to reduce the effect of tracer clearance.

The simplified [18F]FDOPA PET acquisition protocol comprises of the following steps:

The participant 102 arrives at the PET imaging facility.

Where practical, pretreatment 202 is used consisting of carbidopa (150 mg) and entacapone (400 mg) both given orally about one hour before radiotracer injection. Both drugs are used to increase the signal-to-noise ratio (SNR) of the tracer uptake in brain tissue by reducing the peripheral formation of radiolabelled dopamine and brain-penetrating 3-O-methyl-[18F]fluorodopa metabolite, respectively.

The participant receives an IV injection of [18F]FDOPA (MICAD: https://www.ncbi.nlm.nih.gov/books/NBK23043/), target delivery approximately 150 MBq (although higher or lower activity may also be effective). The tracer is administered by intravenous bolus injection over approximately 10 seconds 204 (although a shorter or longer injection time may also be effective).

After an uptake phase (5 to 30 minutes, preferably more than 45 minutes, and most preferably more than 60 minutes) the participant receives the brain PET imaging scan 206. The acquisition is performed in a static acquisition, by acquiring a single volume over a time window of 20 minutes or less. In case multiple volumes are acquired over the acquisition window, a single image can still be retrieved by averaging the volumes and weighting them by their frame lengths; prior to the average the volumes need to be motion corrected by realigning them to the same reference image.

A short CT or MRI image is also acquired from the same participant before or after the PET acquisition and used in the PET image reconstruction to correct for tissue attenuation.

Figure 3:
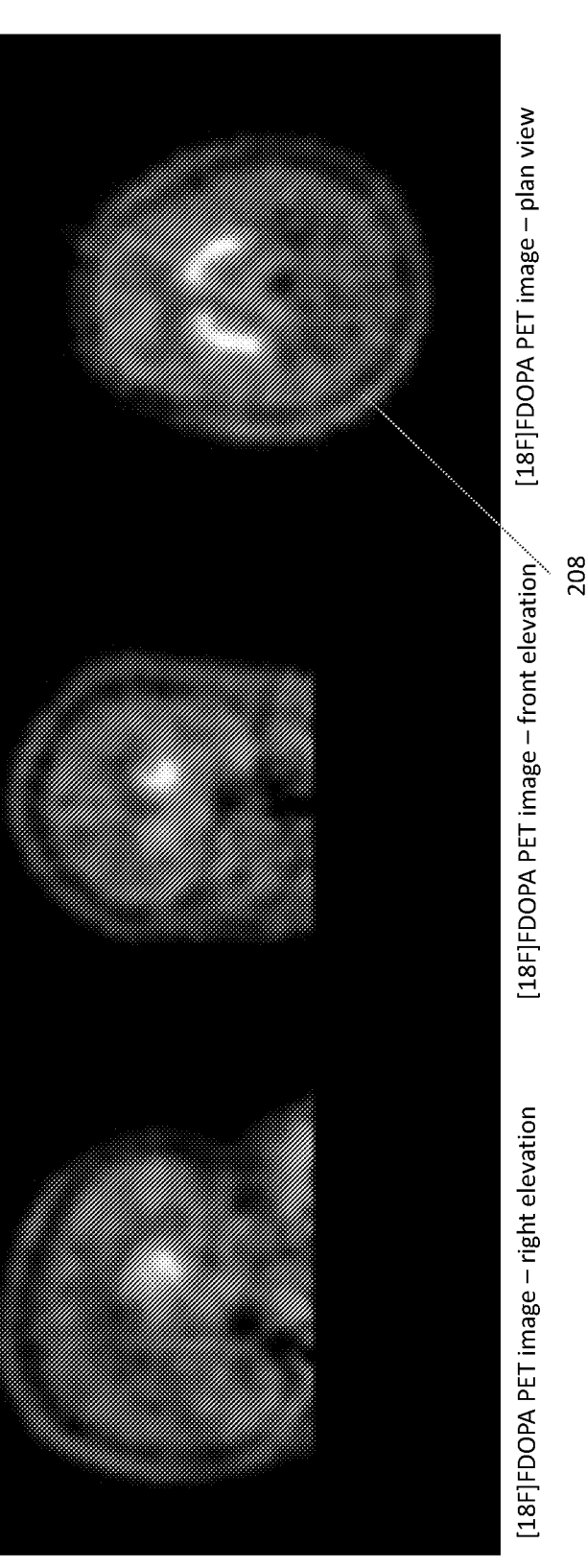
FIG. 3 is a is a representative [18F]FDOPA PET image with the acquisition starting at 60 minutes after the tracer injection and 15 minutes of scanning time. CT is used for attenuation correction. The image is visualised before normalisation to standard MNI coordinates.

An [18F]FDOPA brain PET image 208, as shown in FIG. 3, is reconstructed with the software and the settings recommended by the manufacturer of the PET scanner used in the acquisition. The final [18F]FDOPA brain PET image is corrected for attenuation, tracer radioactive decay as well as for scatter coincidences, random coincidences and scanner dead-time in line with standard practice in acquiring a PET scan and generally using the software in the scanner console.

Component 2—Automated Imaging Analysis Pipeline

Figure 4:
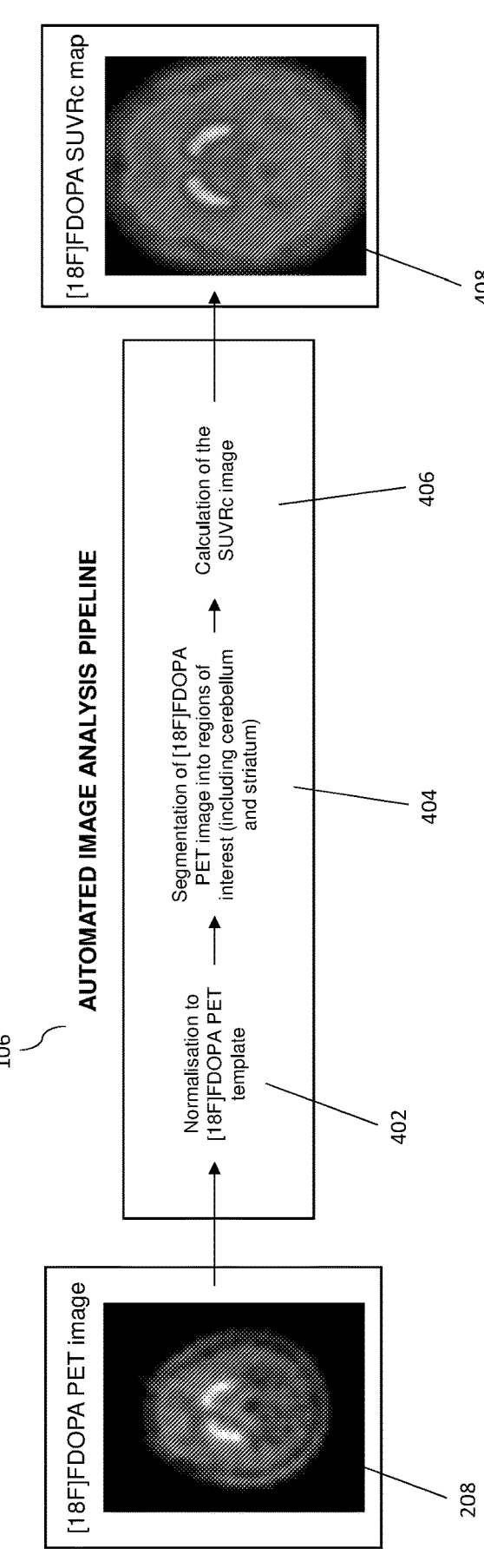
FIG. 4 is a diagram illustrating the automated imaging analysis pipeline.
Figure 5:
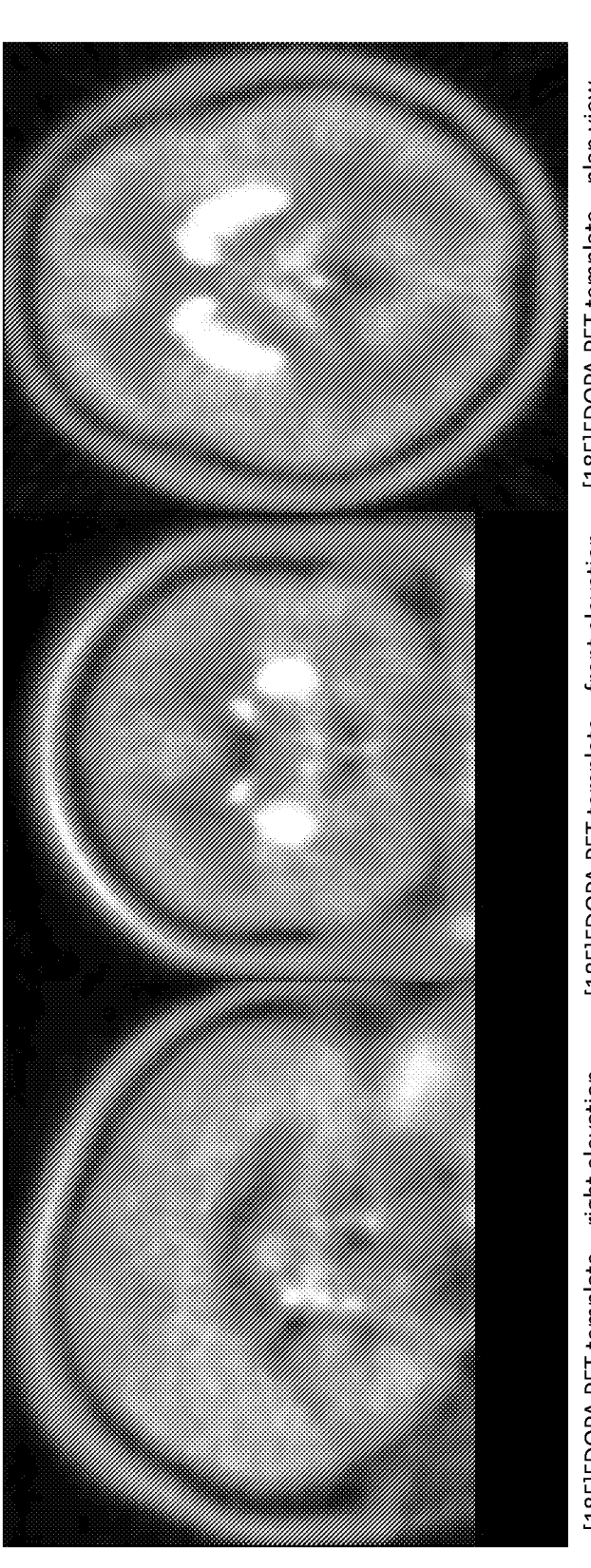
FIG. 5 is the [18F]FDOPA brain PET template in MNI coordinates used for the image normalisation.
Figure 6:
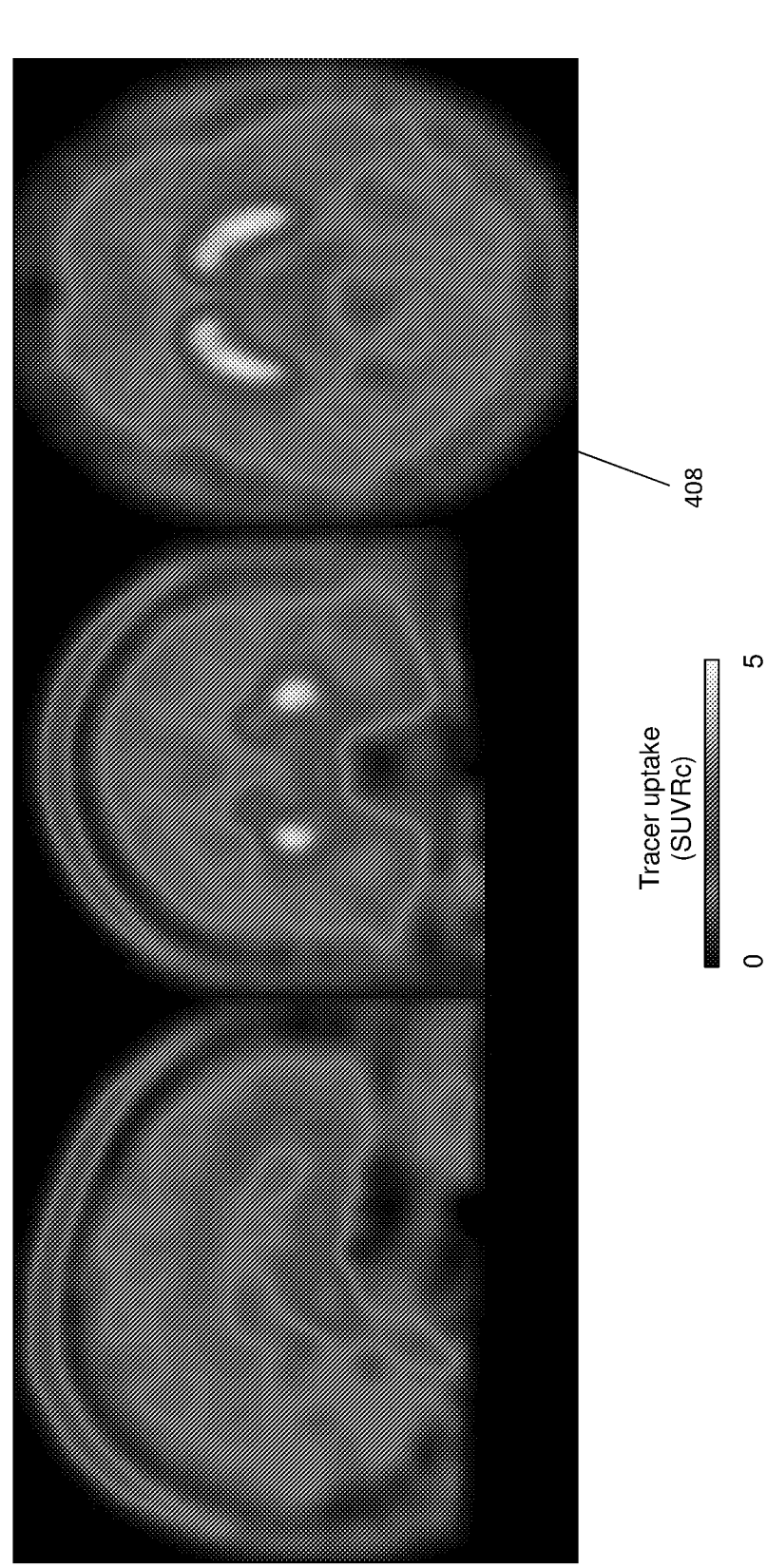
FIG. 6 is a representative [18F]FDOPA SUVRc map. [18F]FDOPA PET data were collected with the acquisition starting at 60 minutes after the tracer injection, 15 minutes of scanning time and CT is used for attenuation correction.

Currently image analysis requires an operator to perform a number of steps using various pieces of software, which is time consuming, requires training and is operator dependent. To address this the inventors have developed an automated image analysis pipeline, see FIG. 4 and FIG. 9. The image analysis pipeline aims to quantify the [18F]FDOPA PET 208 acquired by the simplified protocol and extract the information necessary for the prediction algorithm to classify the patient treatment response. The method is fully-automated to be operator independent. It includes the spatial normalisation of subject [18F]FDOPA brain PET data to a [18F] FDOPA template 402 in standard MNI-ICBM152 coordinates (McConnell Brain Imaging Centre, Montreal Neurological Institute, McGill University), the atlas-based segmentation of brain tissues inclusive of striatum and cerebellum regions 404, and returns a simplified index of [18F]FDOPA uptake (SUVRc) 406, defined by the ratio of the tracer activity in the brain to that in the cerebellum as an index of dopamine synthesis capacity.

The automated imaging analysis pipeline comprises of the following steps:

The [18F]FDOPA PET image 208 acquired from the simplified imaging protocol 104 is spatially normalised 402 to a standard [18F]FDOPA PET template defined in MNI-ICBM152 coordinates. This procedure might use a combination of linear (e.g. affine registrations) and/or non-linear transformations (e.g. spatial basis functions, matching landmarks, or warping vector fields) to identify a spatial transformation that optimises the similarity between the individual [18F]FDOPA brain PET data and the normative [18F]FDOPA PET image (PET2template normalisation). This optimisation may be obtained by maximising the residual sum of squared difference of the voxel intensities of two maps, maximising the correlation coefficient of the two maps, maximising the mutual information content of the two maps, or maximising the overlap of homogenous features. In case of availability of structural images (e.g. T1wMRI, T2wMRI, CT) normalisation of the [18F]FDOPA PET image into a normative template can performed by linearly coregistering the [18F]FDOPA PET to the structural scans, and then normalising the structural scan to the template applying the same transformation to the [18F]FDOPA PET image (StructuralScan2template normalisation). These normalisation procedures (PET2template or StructuralScan2template) can be implemented by combining the spatial transformations included within Statistical Parametric Mapping (e.g. Normalise and Coregister functions) or FSL (e.g. flirt and fnirt functions) packages.

An atlas-based tissue segmentation 404 is applied to the individual [18F]FDOPA PET image 208 in standard MNI-ICBM152 coordinates to extract striatum and cerebellum as main regions of interest. The atlas-based tissue segmentation 404 may be done using the inventors' anatomical atlas based on published brain anatomical land-marks (see https://www.ncbi.nlm.nih.gov/pubmed/12621304). Alternative atlases, such as the Hammersmith atlas (see https://www.researchgate.net/publication/10649756_Three-dimensional_maximum_probability_atlas_of_the_human_brain_with_particular_reference_to_the_temporal_lobe) or the AAL atlases (see https://www.ncbi.nlm.nih.gov/pubmed/11771995) may also be used to provide a parcellation of both striatum and cerebellum structures or substructures.

A simplified index of [18F]FDOPA uptake (SUVRc) is computed. Each voxel of the image is divided by the mean activity of [18F]FDOPA PET in the cerebellum, used in this case as a reference region. As a result, the subject [18F]FDPOPA SUVRc map 408 is calculated, representing a proxy of the individual brain dopamine synthesis capacity.

Component 3—Treatment Response Prediction Algorithm

Figure 7:
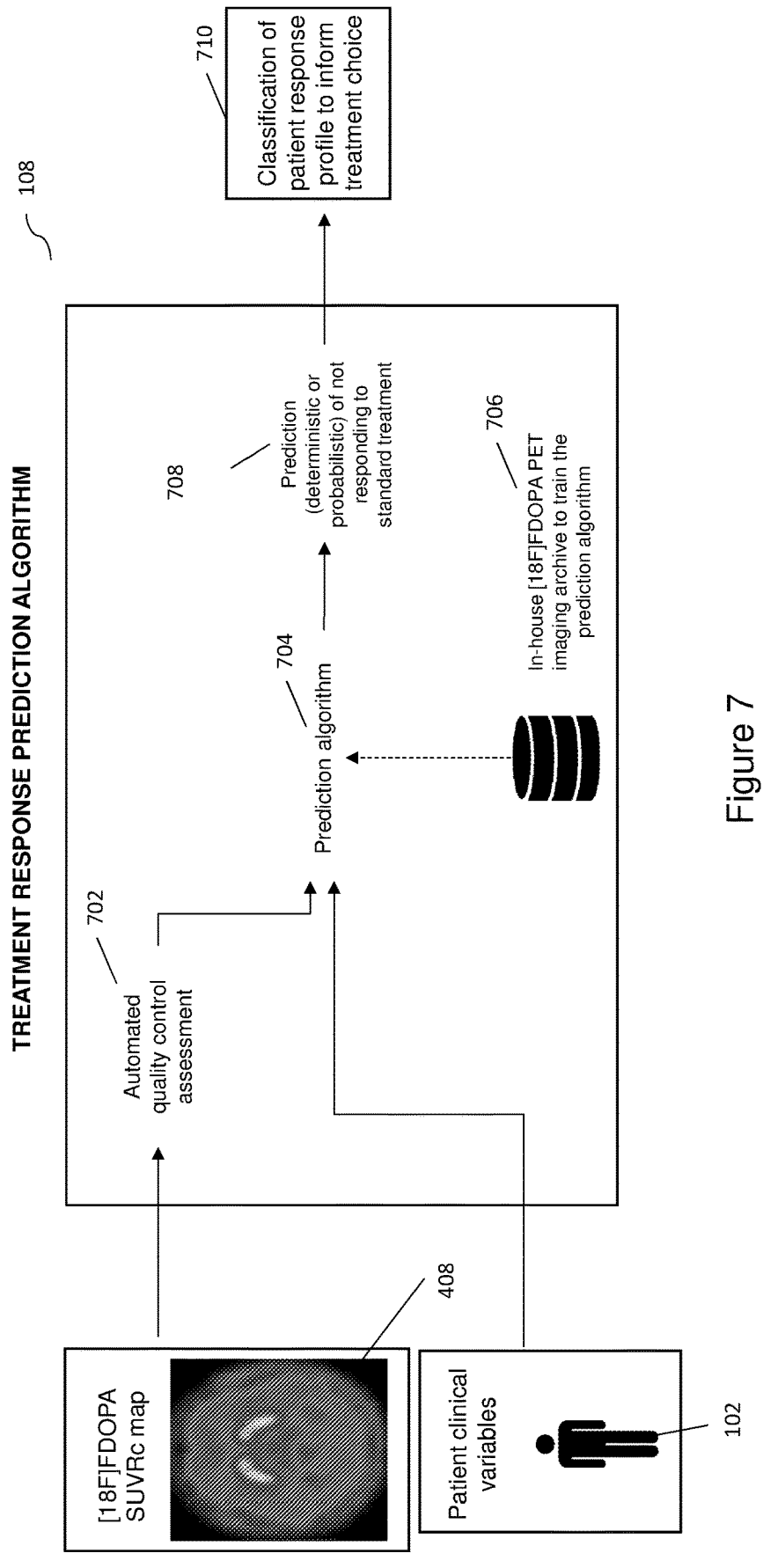
FIG. 7 is a diagram illustrating the prediction algorithm.
Figure 10:
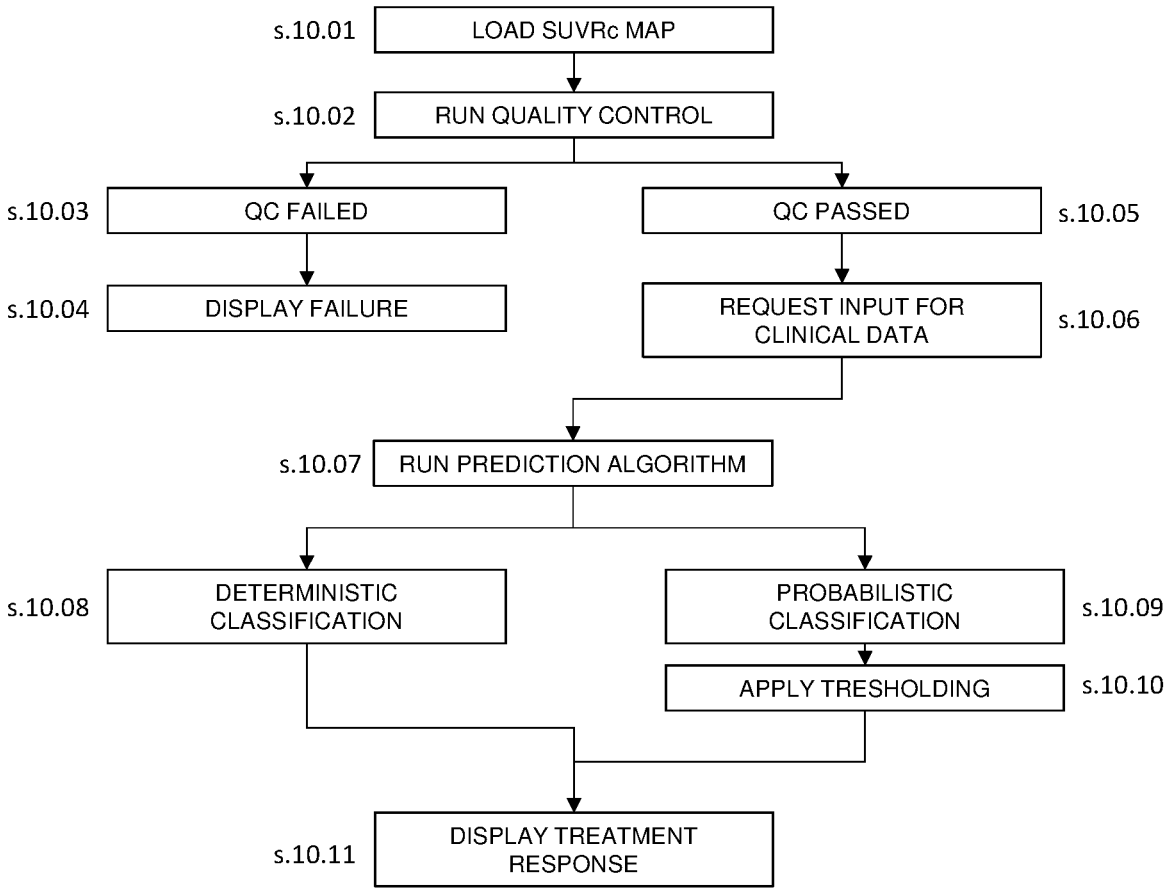
FIG. 10 is a flow diagram according to a second aspect of the present invention.

Currently there is no way to predict whether a patient 102 will respond to antipsychotic treatment or not. To address this the inventors have developed a classification algorithm 108 using the [18F]FDOPA data as the primary input. This step, shown in FIG. 7 and FIG. 10, provides a classification of the individual response treatment profile 710 for the patient with psychosis who received the [18F]FDOPA PET imaging. The [18F]FDPOPA SUVRc map 408 is quality controlled 702 to establish that both the image spatial variance and signal-to-noise ratio match with the requirements of the prediction algorithm. In particular the average signal in the striatum should be the highest across the brain and striatal SUVRc should be significantly higher than the one derived for cerebellum. The [18F]FDOPA SUVRc map 408 is hence used as input in the prediction algorithm 108. The algorithm 108 returns either a deterministic classification profile of the patient as treatment responder or a treatment resister, or the probability of the participant to not respond to standard treatment. In case of the latter, by assuming a probability threshold (e.g. >95%), a deterministic, personalised classification 710 of the patient's response profile is derived.

The treatment response prediction algorithm 704 comprises the following steps:

The individual [18F]FDOPA SUVRc map 408 is quality controlled 702. This includes the analysis of the tracer uptake distribution which should be highest in the striatum region and the analysis of the signal-to-noise ratio (SNR). Statistical testing between brain and non-brain tissues as well between brain and background activity identifies whether the [18F]FDOPA SUVRc map 408 presents the expected signal distribution. The quality control step may also involve analysing the spatial distribution of the individual SUVRc map in comparison with a standard template SUVRc images built from an existing library of quality controlled [18F]FDOPA PET scans. This could include using supervised machine learning (e.g. Logistic Regression, Support Vector Machine, Random Forest, Gaussian process) or deep learning (e.g. artificial neuronal network) algorithms to classify whether the individual SUVRc map is spatially comparable with distribution of the quality-controlled [18F]FDOPA SUVRc maps.

After quality control 702, the individual [18F]FDOPA SUVRc as well as the patient clinical data 102 are used as input into the prediction algorithm 704. The algorithm uses either supervised machine learning (e.g. Logistic Regression, Support Vector Machine, Random Forest, Gaussian process) or deep learning (e.g. artificial neuronal network) method to predict the individual's treatment response profile. The algorithm has been trained using an existing archive of [18F]FDOPA PET images 706 acquired from normal controls and patients with psychosis across multiple sites and scanners. It has been trained to use the absolute SUVRc values at each of the approximately 3,000 voxels in the regions of interest and their spatial distribution in the SUVRc image to identify patterns of values that discriminate between responders and non-responders. It does this using a combination of linear and non-linear models which provide the best discrimination.

The algorithm returns 708 a binomial classification of the subject treatment response (e.g. treatment non-responder/unknown). Alternatively or additionally, the algorithm returns the probability 708 of the individual not responding to standard treatment with a confidence range. A threshold (e.g. >95%) may be applied to individual probability of not responding to standard treatment, to return a deterministic classification profile 710 of the patient as either a treatment responder or treatment resistant.

Figure 8:
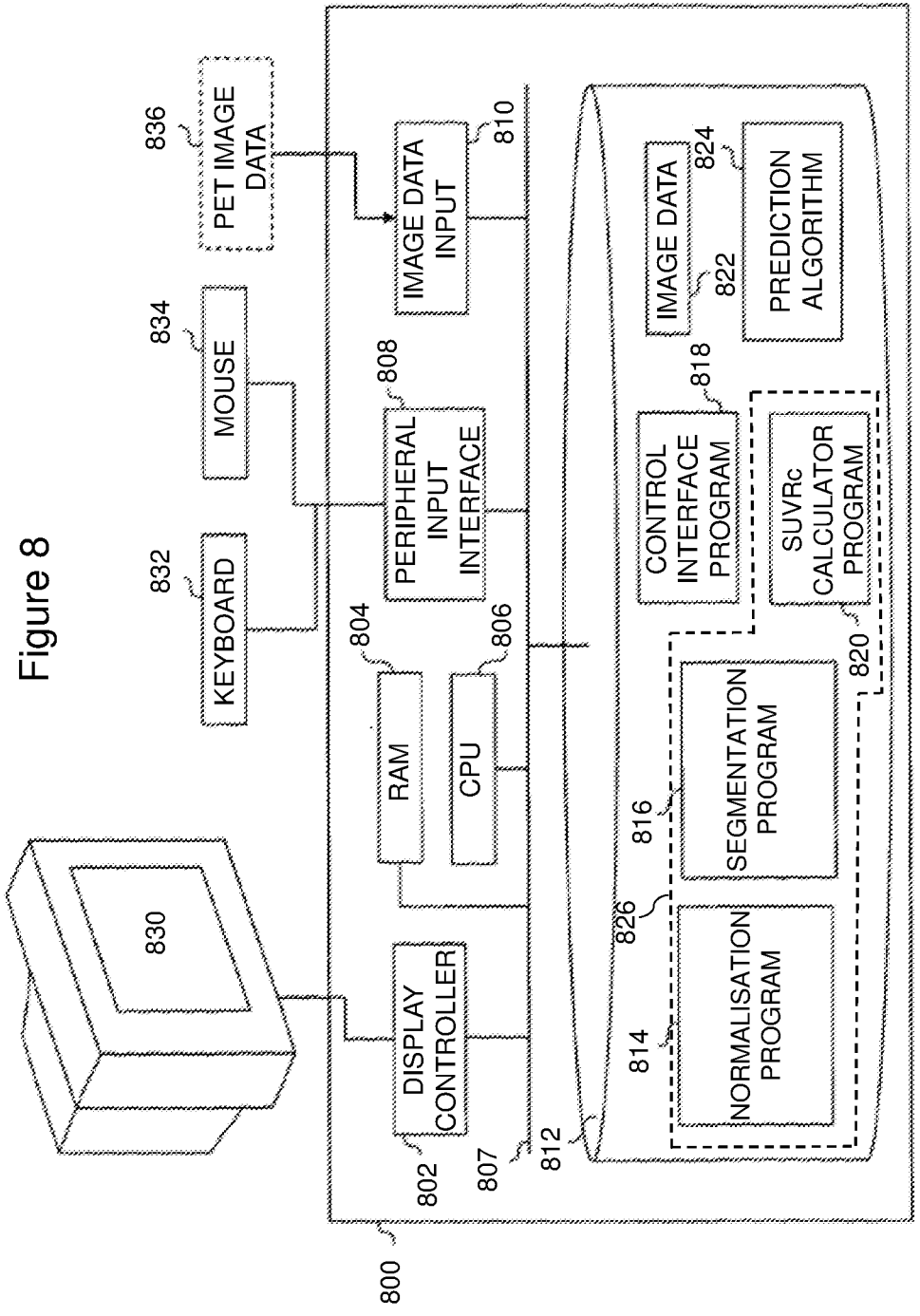
FIG. 8 is a block diagram of a system according to an embodiment of the present invention.

FIG. 8 is a block diagram illustrating an arrangement of a system according to an embodiment of the present invention. Some embodiments of the present invention are designed to run on general purpose desktop or laptop computers. Therefore, according to a first embodiment, a computing apparatus 800 is provided having a central processing unit (CPU) 806, and random access memory (RAM) 804 into which data, program instructions, and the like can be stored and accessed by the CPU. The apparatus 800 is provided with a display screen 830, and input peripherals in the form of a keyboard 832, and mouse 834. Keyboard 832, and mouse 834 communicate with the apparatus 800 via a peripheral input interface 808. Similarly, a display controller 802 is provided to control display 830, so as to cause it to display images under the control of CPU 806. Image data sets, such as PET data sets 836, can be input into the apparatus and stored via image data input 810. In this respect, apparatus 800 comprises a computer readable storage medium 812, such as a hard disk drive, writable CD or DVD drive, zip drive, solid state drive, USB drive or the like, upon which image data 822 corresponding to the PET data sets input can be stored. Alternatively, the image data 836 could be stored on a web-based platform, e.g. a database (e.g. XNAT), and accessed via an appropriate network. Computer readable storage medium 812 also stores various programs, which when executed by the CPU 806 cause the apparatus 800 to operate in accordance with some embodiments of the present invention.

In particular, a control interface program 818 is provided, which when executed by the CPU 806 provides overall control of the computing apparatus, and in particular provides a graphical interface on the display 830, and accepts user inputs using the keyboard 832 and mouse 834 by the peripheral interface 808. The control interface program 818 also calls, when necessary, other programs to perform specific processing actions when required. In particular, a normalisation program 814 is provided which is able to operate on image data 822 indicated by the control interface program 818, so as to perform a normalisation step on the image data 822, such that the image data 822 is aligned with a standard template. This may be done using Statistical Parametric Mapping, FSL or similar. Similarly, a segmentation program 816 is also provided, which, under control of the control interface program 818, operates on image data 822 passed thereto so as to segment the image data 822 into regions of interest. This may be done using manual drawing, atlas-based tissue segmentation, thresholding, clustering (e.g. k-means clustering), edge detection or region-growing methods. The operations of the normalisation program 814 and the segmentation program 816 are described above.

Additionally provided is a SUVRc calculator program 820, which, when called by the control interface program 818, calculates the SUVRc defined above and creates a SUVRc image.

Also provided is a prediction algorithm 824, which when called by the control interface program 818, takes inputs of SUVRc images and patient data and uses machine learning to output a probability of a patient not responding to standard treatment, as described above.

The detailed operation of the computing apparatus 800 will now be described. Firstly, the user launches the control interface program 818. The control interface program 818 is loaded into RAM 804, and is executed by the CPU 806. The user then launches an automatic imaging analysis program 826, which is comprised of a normalisation program 814, a segmentation program 816, and a SUVRc calculator program 820. The automatic imaging analysis program 826 acts on the image data 822 to normalise, segment and calculate an SUVRc map, as described above.

Figure 9:
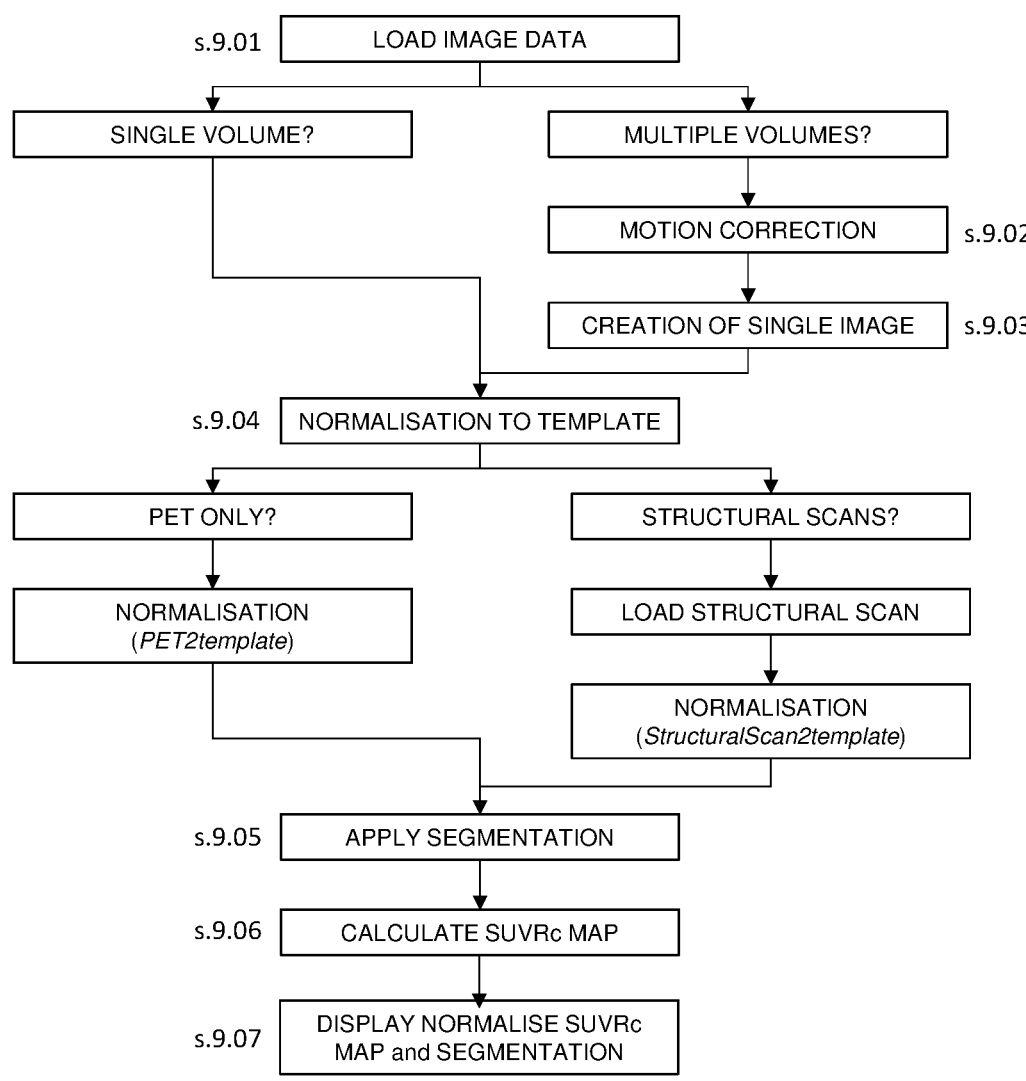
FIG. 9 is a flow diagram according to a first aspect of the present invention.

As shown in FIG. 9, the image data is loaded (s.9.01) into the automated imaging analysis program 826. If the image data is comprised of a single volume, the image passes directly to the normalisation step (s.9.04). If the image data is comprised of multiple volumes, the image data is motion corrected (s.9.02) by realigning the images to the same reference image. The volumes are then averaged and weighted by their frame lengths to create a single image (s.9.03). The single image is then normalised (s.9.04). If the image data is only comprised of PET image(s), a spatial transformation that optimises the similarity between the individual [18F]FDOPA brain PET data and the normative [18F]FDOPA PET image is used (PET2template normalisation), as described above in the Component 2 section. In the case of availability of structural images, the structural scans are loaded and normalisation of the [18F]FDOPA PET image into a normative template can performed by linearly co-registering the [18F]FDOPA PET to the structural scans, and then normalising the structural scan to the template applying the same transformation to the [18F]FDOPA PET image (StructuralScan2template normalisation), as described above in the Component 2 section. After normalisation, segmentation is applied (s.9.05), the SUVRc map is calculated (s.9.06) and displayed (s.9.07) as described in the Component 2 section.

As shown in FIG. 10, the SUVRc map is then passed to the prediction algorithm 824 (s.10.01). The prediction algorithm program may include a quality control step (s.10.02) to check the SUVRc map is usable before it enters the prediction algorithm itself. If the quality SUVRc map fails (s.10.03) the quality control the program stops here and may display a failure message (s.10.04). If the SUVRc passes the quality control (s.10.05) the program continues and requests clinical data (s.10.06). The SUVRc map and patient data are used as inputs into the prediction algorithm which uses machine learning which has been trained on PET image data, as described above. The prediction algorithm is then run (s.10.07). Depending on the type of prediction algorithm implemented (deterministic vs probabilistic) the program returns a deterministic classification (s.10.08) of treatment response (i.e. non responders/unknown) or the probability (s.10.09) of the patient to not response to treatment. In case of the latter, the program applies a threshold (s.10.10) to convert that probability into a deterministic response. Finally the program displays the classification (s.10.11) which may inform the treatment choice of the patient. The prediction algorithm is described in detail in the Component 3 section above.

Various modifications whether by way of addition, deletion, or substitution of features may be made to above described embodiment to provide further embodiments, any and all of which are intended to be encompassed by the appended claims.

REFERENCES

Davis, K. L. and R. S. Kahn (1991). "Dopamine in schizophrenia: a review and reconceptualization." The American journal of psychiatry 148(11): 1474.

Demjaha, A., R. M. Murray, P. K. McGuire, S. Kapur and O. D. Howes (2012). "Dopamine synthesis capacity in patients with treatment-resistant schizophrenia." American Journal of Psychiatry 169(11): 1203-1210.

Egerton, A., C. A. Chaddock, T. T. Winton-Brown, M. A. Bloomfield, S. Bhattacharyya, P. Allen, P. K. McGuire and O. D. Howes (2013). "Presynaptic striatal dopamine dysfunction in people at ultra-high risk for psychosis: findings in a second cohort." Biological psychiatry 74(2): 106-112.

Howes, O., A. Egerton, V. Allan, P. McGuire, P. Stokes and S. Kapur (2009). "Mechanisms underlying psychosis and antipsychotic treatment response in schizophrenia: insights from PET and SPECT imaging." Current pharmaceutical design 15(22): 2550-2559.

Howes, O., R. McCutcheon and J. Stone (2015). "Glutamate and dopamine in schizophrenia: an update for the 21st century." Journal of psychopharmacology 29(2): 97-115.

Howes, O. D., S. K. Bose, F. Turkheimer, I. Valli, A. Egerton, L. R. Valmaggia, R. M. Murray and P. McGuire (2011). "Dopamine synthesis capacity before onset of psychosis: a prospective [18F]-DOPA PET imaging study." American Journal of Psychiatry 168(12): 1311-1317.

Howes, O. D., J. Kambeitz, E. Kim, D. Stahl, M. Slifstein, A. Abi-Dargham and S. Kapur (2012). "The nature of dopamine dysfunction in schizophrenia and what this means for treatment: meta-analysis of imaging studies." Archives of general psychiatry 69(8): 776-786.

Howes, O. D. and S. Kapur (2009). "The dopamine hypothesis of schizophrenia: version III—the final common pathway." Schizophrenia bulletin 35(3): 549-562.

Howes, O. D., R. McCutcheon, O. Agid, A. De Bartolomeis, N. J. Van Beveren, M. L. Birnbaum, M. A. Bloomfield, R. A. Bressan, R. W. Buchanan and W. T. Carpenter (2017). "Treatment-resistant schizophrenia: treatment response and resistance in psychosis (TRRIP) working group consensus guidelines on diagnosis and terminology." American Journal of Psychiatry 174(3): 216-229.

Howes, O. D., F. Vergunst, S. Gee, P. McGuire, S. Kapur and D. Taylor (2012). "Adherence to treatment guidelines in clinical practice: study of antipsychotic treatment prior to clozapine initiation." The British Journal of Psychiatry 201(6): 481-485.

Jauhar, S., M. M. Nour, M. Veronese, M. Rogdaki, I. Bonoldi, M. Azis, F. Turkheimer, P. McGuire, A. H. Young and O. D. Howes (2017). "A test of the transdiagnostic dopamine hypothesis of psychosis using positron emission tomographic imaging in bipolar affective disorder and schizophrenia." JAMA psychiatry 74(12): 1206-1213.

Jauhar, S., M. Veronese, M. M. Nour, M. Rogdaki, P. Hathway, F. E. Turkheimer, J. Stone, A. Egerton, P. McGuire and S. Kapur (2018). "Determinants of treatment response in first-episode psychosis: an 18 F-DOPA PET study." Molecular psychiatry: 1.

Kapur, S., R. Zipursky, C. Jones, G. Remington and S. Houle (2000). "Relationship between dopamine D2 occupancy, clinical response, and side effects: a double-blind PET study of first-episode schizophrenia." American Journal of Psychiatry 157(4): 514-520.

Kennedy, J. L., C. A. Altar, D. L. Taylor, I. Degtiar and J. C. Hornberger (2014). "The social and economic burden of treatment-resistant schizophrenia: a systematic literature review." International clinical psychopharmacology 29(2): 63-76.

The invention claimed is:

1. A method of predicting treatment response of a patient with a mental disorder comprising:

receiving a map of a patient's brain displaying uptake of a DOPA labelled radiotracer; and inputting the map and patient data into a prediction algorithm, which outputs a prediction of whether the patient will not respond to standard treatment, wherein the algorithm has been trained on: (a) an existing DOPA labelled radiotracer PET dataset from patients with a mental disorder which have responded to standard treatment; (b) images of patients which did not response to standard treatment; and (c) control images.

2. The method according to claim 1, wherein the output further comprises a probability of the patient not responding to standard treatment.

3. The method according to claim 2, wherein the algorithm further comprises applying a threshold to the probability of the patient not responding to standard treatment; and preferably wherein the threshold is >95%.

4. The method according to claim 1, wherein the algorithm further comprises returning a deterministic classification profile of the patient as either a treatment responder or a treatment resister.

5. The method according to claim 1, wherein the algorithm further comprises performing a quality control step on the map, and wherein the quality control step comprises one or more of the following:

(i) analysing DOPA labelled radiotracer activity to ensure DOPA labelled radiotracer activity is highest in the striatum region;

(ii) analysing signal-to-noise ratio of DOPA labelled radiotracer activity;

(iii) statistical testing of DOPA labelled radiotracer activity between brain and non-brain tissues;

(iv) statistical testing of DOPA labelled radiotracer activity between brain and background activity, (v) analysing the spatial distribution of the brain DOPA labelled radiotracer activity in comparison with a standard template of images which may preferably be built from an existing library of quality controlled DOPA labelled scans.

6. The method of claim 1, wherein the map has been produced by analysing a PET image from a single subject patient obtained using the DOPA labelled radiotracer by:

spatially normalising the PET image to a standard template;

segmenting the PET image to define at least one region of interest;

computing an index of the uptake of the DOPA labelled radiotracer; and producing a map displaying a magnitude of the index in a patient's brain;

wherein the map is produced from a plurality of voxels of the PET image in dependence on the activity of the DOPA labelled radiotracer in at least one or more of: i) a reference region of the PET image; and/or ii) the at least one region of interest.

7. The method according to claim 6, wherein segmenting the PET image comprises applying atlas-based tissue segmentation to the PET image; and preferably wherein the atlas-based tissue segmentation is applied to the PET image in standard MNI coordinates.

8. The method according to claim 7, wherein spatially normalising the PET image comprises using a combination of linear and/or non-linear transformations.

9. The method according to claim 8, wherein the linear transformations comprise affine transformations; and/or the non-linear transformations comprise warp maps.

10. The method according to claim 6, wherein the standard template is a standard DOPA labelled radiotracer PET template.

11. The method according to claim 10, wherein the standard DOPA labelled radiotracer PET template is in standard MNI coordinates.

12. The method according to claim 6, wherein the at least one region of interest comprises a first and a second region of interest, wherein the index of the DOPA labelled radiotracer uptake is defined by the ratio of DOPA labelled radiotracer activity in the first region of interest to that in the second region of interest.

13. The method according to claim 12, wherein the first region of interest is a striatum and the second region of interest is a cerebellum.

14. The method according to claim 6, wherein the map is produced by normalising voxel values of the PET image in dependence on an activity measure of the DOPA labelled radiotracer in the reference region of the PET image;

wherein optionally the normalising comprises dividing each voxel of the PET image by mean activity of the DOPA labelled radiotracer in a cerebellum.

15. The method according to claim 1, wherein the DOPA labelled radiotracer is [18F]FDOPA.

16. A method of obtaining a DOPA PET image of a patient with a mental disorder for use in a method according to claim 1 comprising:

administering a DOPA labelled radiotracer to the patient via an intravenous bolus injection; and performing a PET scan over a time period to form the PET image, wherein the time period is less than 20 minutes.

17. A method according to claim 16, wherein the time period is less than 15 minutes, and preferably less than 10 minutes.

18. A system for predicting treatment response of a patient with a mental disorder, the system comprising:

a processor; and a memory including computer program code the memory and the computer program code configured to, with the processor, cause the apparatus to perform of predicting treatment response of a patient with a mental disorder comprising:

receiving a map of a patient's brain displaying uptake of a DOPA labelled radiotracer; and inputting the map and patient data into a prediction algorithm, which outputs a prediction of whether the patient will not respond to standard treatment, wherein the algorithm has been trained on: (a) an existing DOPA labelled radiotracer PET dataset from patients with a mental disorder which have responded to standard treatment; (b) images of patients which did not response to standard treatment; and (c) control images.

19. A system for predicting treatment response of a patient with a mental disorder, the system comprising:

a PET scanner;

a processor; and a memory including computer program code the memory and the computer program code configured to, with the processor, cause the apparatus to perform a method of obtaining a DOPA PET image of a patient with a mental disorder for use in a method according to claim 1 comprising:

administering a DOPA labelled radiotracer to the patient via an intravenous bolus injection; and performing a PET scan over a time period to form the PET image, wherein the time period is less than 20 minutes.

\* \* \* \* \*